(12) United States Patent
Takai et al.

(10) Patent No.: US 10,766,354 B2
(45) Date of Patent: Sep. 8, 2020

(54) VEHICLE HAVING COOLING ARRANGEMENT DISPOSED BELOW FLOOR SURFACE

(71) Applicant: HONDA MOTOR CO., LTD., Tokyo (JP)

(72) Inventors: Keisuke Takai, Saitama (JP); Yuji Koga, Saitama (JP); Yoshiaki Konishi, Saitama (JP); Makoto Tsuchihashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/366,395

(22) Filed: Mar. 27, 2019

(65) Prior Publication Data

US 2019/0299772 A1    Oct. 3, 2019

(30) Foreign Application Priority Data

Mar. 28, 2018 (JP) .................. 2018-062567

(51) Int. Cl.
*B60K 1/04* (2019.01)
*B60K 11/04* (2006.01)
*B60K 11/08* (2006.01)
*B60K 1/00* (2006.01)
*B60K 11/02* (2006.01)

(52) U.S. Cl.
CPC ............... *B60K 11/04* (2013.01); *B60K 1/00* (2013.01); *B60K 1/04* (2013.01); *B60K 11/08* (2013.01); *B60K 11/02* (2013.01); *B60K 2001/001* (2013.01); *B60K 2001/006* (2013.01); *B60K 2001/0438* (2013.01); *B60Y 2400/61* (2013.01)

(58) Field of Classification Search
CPC ....... B60K 11/085; B60K 11/02; B60K 11/04; B60K 11/08; B60K 11/06; F01P 5/02
See application file for complete search history.

(56) References Cited

U.S. PATENT DOCUMENTS 9,188,052 B2 * 11/2015 Tajima .................. B60K 11/04
9,926,022 B1    3/2018 Golembeski et al.
(Continued)

FOREIGN PATENT DOCUMENTS

JP    2001-253257 A    9/2001
JP    2012-224152 A    11/2012
(Continued)

OTHER PUBLICATIONS

Aug. 16, 2019, European Search Report issued for related EP Application No. 19165479.7.
(Continued)

*Primary Examiner* — James A Shriver, II
*Assistant Examiner* — James J Triggs
(74) *Attorney, Agent, or Firm* — Paratus Law Group, PLLC

(57) ABSTRACT

A vehicle includes a motor configured to drive a vehicle wheel, a battery configured to supply electric power to the motor, and a radiator configured to exchange heat between a coolant for cooling the motor and outside air. The radiator is disposed below a floor surface of the vehicle and in a gap between the motor and the battery in a front-rear direction of the vehicle.

3 Claims, 2 Drawing Sheets

(56) References Cited

U.S. PATENT DOCUMENTS

| | | | |
|---|---|---|---|
| 2011/0284298 A1* | 11/2011 | Ajisaka | B60H 1/00535 |
| | | | 180/65.21 |
| 2014/0138077 A1* | 5/2014 | Ajisaka | B60K 11/04 |
| | | | 165/287 |
| 2014/0299396 A1 | 10/2014 | Tajima | |
| 2018/0029463 A1 | 2/2018 | Ajisaka | |

FOREIGN PATENT DOCUMENTS

| | | |
|---|---|---|
| JP | 2013-180614 A | 9/2013 |
| JP | 2014-101066 A | 6/2014 |
| WO | WO 2010/097890 A1 | 9/2010 |

OTHER PUBLICATIONS

Oct. 1, 2019, Japanese Office Action issued for related JP Application No. 2018-062567.

* cited by examiner

VEHICLE HAVING COOLING ARRANGEMENT DISPOSED BELOW FLOOR SURFACE

CROSS-REFERENCE TO RELATED APPLICATIONS

This application is based on and claims priority under 35 USC 119 from Japanese Patent Application No. 2018-062567 filed on Mar. 28, 2018.

TECHNICAL FIELD

The present invention relates to a vehicle including a motor and a battery.

BACKGROUND ART

JP-A-2001-253257 describes an automatic transmission fluid (ATF) cooler in which a heat exchanger, which exchanges heat between an engine coolant and an ATF supplied circularly to a transmission, is disposed inside a clutch case, and an engine cooler radiator and the heat exchanger are connected by an oil passage. JP-A-2001-253257 does not describe where the engine cooler radiator is disposed, but in a general vehicle, the engine cooler radiator is disposed at a forefront portion of an engine compartment of the vehicle with good cooling efficiency.

However, when a radiator of the ATF cooler is to be disposed at the forefront portion of the engine compartment of the vehicle, the oil passage becomes long in the vehicle in which the transmission is disposed in a rear portion of the vehicle. Meanwhile, in recent years, an electric motor has been used as a drive source in an electric vehicle or a hybrid vehicle, and it is a very important problem to ensure a cooling performance of the radiator in light of efficiently cooling the electric motor.

SUMMARY

Accordingly, an aspect of the present invention provides a vehicle which can effectively utilize a dead space around a motor to dispose a radiator and ensure a cooling performance of the radiator.

According to an embodiment of the present invention, there is provided a vehicle including:

a motor configured to drive a vehicle wheel;

a battery configured to supply electric power to the motor; and a radiator configured to exchange heat between a coolant for cooling the and outside air, wherein the radiator is disposed below a floor surface of the vehicle and in a gap between the motor and the battery in a front-rear direction of the vehicle.

According to the above configuration, by disposing the radiator in the gap between the motor and the battery, the radiator can be disposed by effectively utilizing a dead space around the motor. In addition, by disposing the radiator below the floor surface, a cooling performance of the radiator can be enhanced.

DESCRIPTION OF EMBODIMENTS

Hereinafter, a vehicle according to an embodiment of the present invention will be described with reference to the accompanying drawings.

Figure 1:
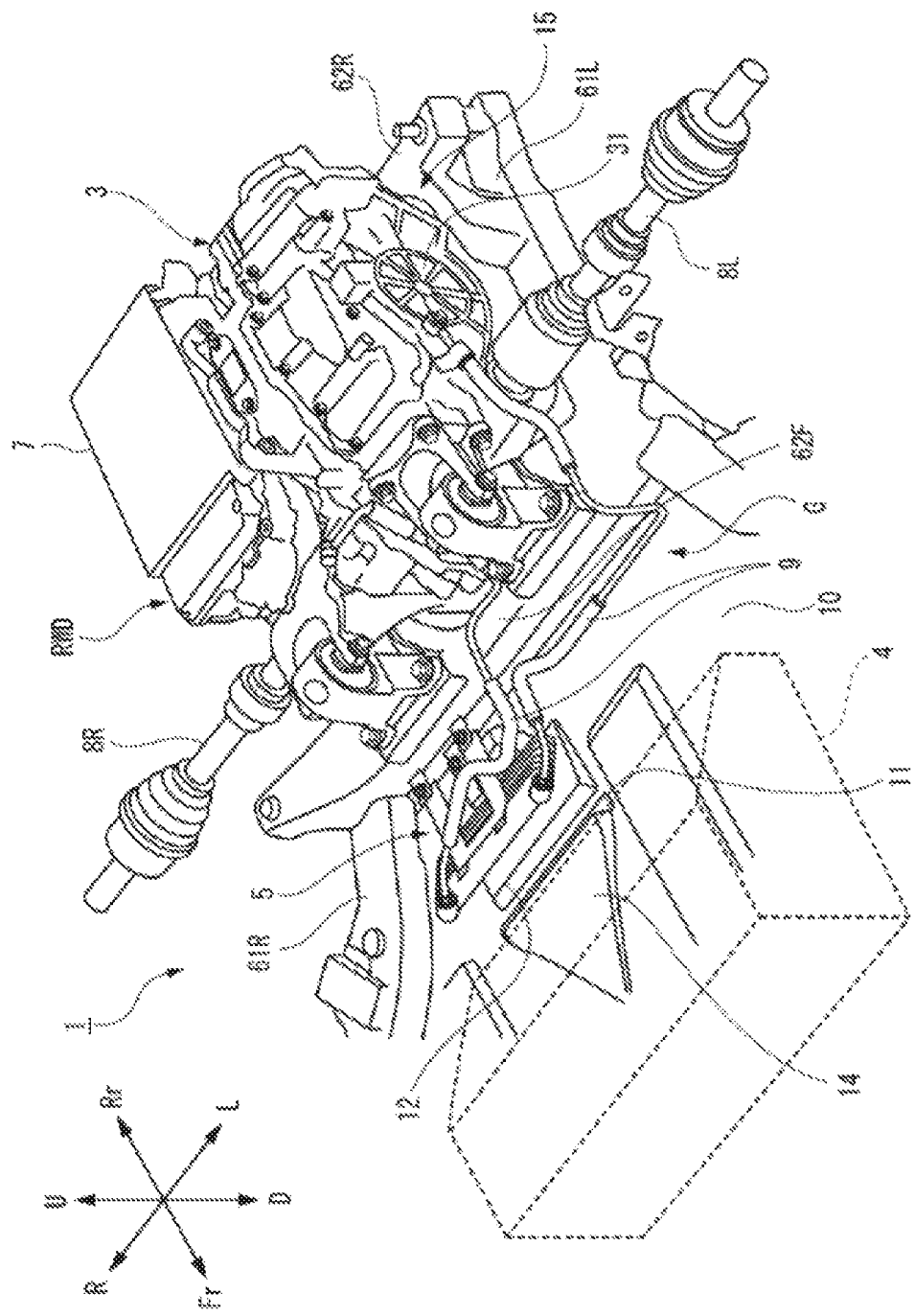
FIG. 1 is a perspective view of a rear wheel drive device of a vehicle according to an embodiment of the present invention.
Figure 2:
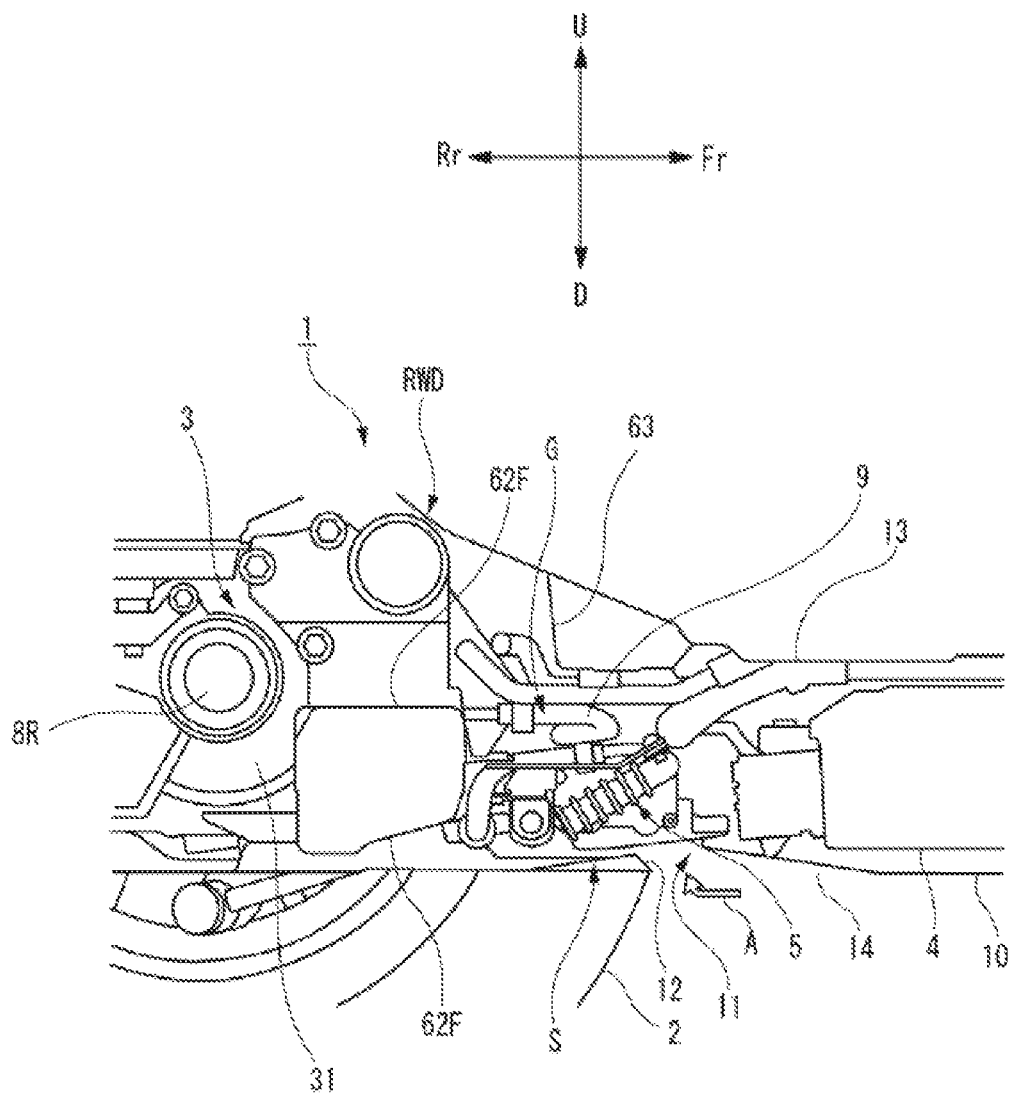
FIG. 2 is a side view of the rear wheel drive device in FIG. 1.

As shown in FIGS. 1 and 2, a vehicle 1 according to an embodiment of the present invention includes a rear wheel drive device RWD at a rear portion of the vehicle 1. The rear wheel drive device RWD includes a motor 3 configured to drive a vehicle wheel 2 that is a rear wheel, a battery 4 configured to supply electric power to the motor 3, a radiator 5 configured to exchange heat between a coolant for cooling the motor 3 and a traveling wind (outside air) A, and an inverter 7 configured to convert the electric power between the motor 3 and the battery 4.

The motor 3 is supported by a front frame member 62F and a rear frame member 62R in a state of being accommodated below a floor surface 13 in a substantially rectangular motor accommodating portion 15 defined by a pair of side members 61L, 61R extending in a front-rear direction and the front frame member 62F and the rear frame member 62R which connect the pair of side members 61L, 61R. An inverter 7 is installed in the motor accommodating portion 15 so as to be adjacent to the motor 3 in a vehicle width direction. In the motor 3, a transmission (not shown) is provided in a motor case 31, and a torque of the motor 3 is transmitted to output shafts 8L, 8R via the transmission, and is transmitted from the output shafts 8L, 8R to the vehicle wheel 2.

The battery 4 is disposed below the floor surface 13 and adjacent to the front of the motor 3. The radiator 5 is connected to the motor 3 via a refrigerant pipe 9. The motor 3 is cooled by circularly supplying a refrigerant liquid cooled by the radiator 5 through the refrigerant pipe 9.

The radiator 5 is disposed in a gap G between the motor 3 and the battery 4 in the front-rear direction of the vehicle 1. According to the configuration, the radiator 5 can be disposed in a dead space between the motor 3 and the battery 4 without increasing a size of a peripheral structure of the motor 3. In addition, since the radiator 5 is disposed below the floor surface 13, it is exposed to the traveling wind A when the vehicle 1 travels. Accordingly, the heat is exchanged between the coolant and the outside air, and the motor 3 can be efficiently cooled. Further, by disposing the radiator 5 near the motor 3, a flow path of the refrigerant pipe 9 can be shortened as compared with a case where the radiator 5 is disposed in another place, for example, an engine compartment of the vehicle 1.

The radiator 5 is covered with an undercover 10 from below. Moreover, a cross member 63 exists above the radiator 5, and in front of and above the front frame member 62F. Namely, the radiator 5 is disposed in a space S surrounded by the front frame member 62F, the cross member 63, the battery 4, and the undercover 10. In this manner, the radiator 5 is surrounded by the front frame member 62F, the cross member 63, the battery 4, and the undercover 10, so that safety of the radiator 5 is ensured. In addition, the radiator 5 is covered with the undercover 10 from below, so that the radiator 5 can be protected from flying stones or the like.

Here, when the radiator 5 is covered with the undercover 10 from below, it is difficult for the traveling wind to hit the radiator 5. However, in the present embodiment, the undercover 10 covering the radiator 5 from below is provided with an opening portion 11 for supplying the traveling wind A to the radiator 5. In addition, the radiator 5 is disposed behind and above the opening portion 11 in a state of being inclined downward from the front to the rear of the vehicle 1.

That is, the opening portion 11 is provided in front of the radiator 5, and the radiator 5 is disposed in the state of being inclined downward from the front to the rear of the vehicle 1, so that the radiator 5 is more likely to receive the traveling wind A. Accordingly, since heat exchange efficiency between the refrigerant liquid in the radiator 5 and the traveling wind A is enhanced, the cooling performance is improved.

The undercover 10 is provided with an inclined surface 12 which faces the opening portion 11 and is inclined upward from the front to the rear of the vehicle 1. The inclined surface 12 is provided behind the opening portion 11 and below the radiator 5. According to the configuration, since the traveling wind A supplied from the opening portion 11 flows toward the radiator 5 along the inclined surface 12, the cooling performance is further improved.

The opening portion 11 is an outlet portion of a duct 14 recessed by the undercover 10 such that a length in the vehicle width direction gradually increases toward the rear of the vehicle 1. Accordingly, the traveling wind is efficiently taken in.

The above-described embodiment may be appropriately modified, improved, or the like.

For example, although in the above-described embodiment, the motor 3 including the transmission in the motor case 31 is exemplified, the present invention is not limited thereto, and the motor 3 may be a motor without the transmission.

In addition, although in the above-described embodiment, the rear wheel drive device RWD is exemplified, the present invention may be applied to a front wheel drive device.

At least the following matters are described in the present specification. Although the corresponding constituent elements or the like in the above-described embodiment are shown in parentheses, the present invention is not limited thereto.

(1) A vehicle (vehicle 1) includes:
a motor (motor 3) configured to drive a vehicle wheel (vehicle wheel 2);
a battery (battery 4) configured to supply electric power to the motor; and
a radiator (radiator 5) configured to exchange heat between a coolant for cooling the motor and outside air (traveling wind A),
wherein the radiator is disposed below a floor surface (floor surface 13) and in a gap (gap G) between the motor and the battery in a front-rear direction of the vehicle.

According to (1), by disposing the radiator in the gap between the motor and the battery, the radiator can be disposed by effectively utilizing a dead space around the motor. In addition, by disposing the radiator below the floor surface, a cooling performance of the radiator can be enhanced. According a cooling performance of the motor can be improved.

(2) In the vehicle according to (1),
the radiator is disposed in a state of being inclined downward from the front to the rear of the vehicle and is covered with an undercover (undercover 10) from below, and the undercover includes an opening portion (opening portion 11) for supplying the outside air to the radiator in front of the radiator with respect to the vehicle.

According to (2), since the radiator is covered with the undercover from below, the radiator can be protected from flying stones or the like. In addition, since the undercover includes the opening portion for supplying the outside air to the radiator in front of the radiator, and the radiator is disposed in the state of being inclined downward from the front to the rear of the vehicle, the radiator is more likely to receive the traveling wind, and the cooling performance can be enhanced.

(3) In the vehicle according to (2),
the undercover includes an inclined surface (inclined surface 12) which is behind the opening portion and below the radiator and which faces the opening portion and is inclined upward from the front to the rear of the vehicle.

According to (3), since the undercover includes the inclined surface which is behind the opening portion and below the radiator and which faces the opening portion and is inclined upward from the front to the rear of the vehicle, the traveling wind supplied from the opening portion flows toward the radiator along the inclined surface, so that the cooling performance is further improved.

(4) In the vehicle according to (2) or (3),
the radiator is disposed in a space (space S) surrounded by a frame member (front frame member 62F) supporting the motor, a cross member (cross member 63), the battery, and the undercover.

According to (4), since the radiator is disposed in the space surrounded by the frame member supporting the motor, the cross member, the battery, and the undercover, safety is high.

The invention claimed is:

1. A vehicle comprising:
a motor configured to drive a vehicle wheel;
a battery configured to supply electric power to the motor; and
a radiator configured to exchange heat between a coolant for cooling the motor and outside air,
wherein the radiator is disposed below a floor surface of the vehicle and in a gap between the motor and the battery in a front-rear direction of the vehicle in a state of being inclined downward from the front to the rear of the vehicle, and is covered with an undercover from below, and
wherein the undercover includes an opening portion for supplying the outside air to the radiator in front of the radiator with respect to the vehicle.

2. The vehicle according to claim 1,
wherein the undercover includes an inclined surface which is behind the opening portion and below the radiator and which faces the opening portion and is inclined upward from the front to the rear of the vehicle.

3. The vehicle according to claim 1,
wherein the radiator is disposed in a space that is surrounded by a frame member supporting the motor, a cross member, the battery, and the undercover.

* * * * *